No. 870,213. PATENTED NOV. 5, 1907.
E. E. ARNOLD.
RAIL TRAVERSING TRUCK.
APPLICATION FILED APR. 13, 1905.

WITNESSES:
G. L. Ryder.
E. W. McCallister

INVENTOR
Edwin E. Arnold
BY Jno. S. Green.
ATTORNEY

UNITED STATES PATENT OFFICE.

EDWIN E. ARNOLD, OF WILKINSBURG, PENNSYLVANIA, ASSIGNOR TO THE WESTINGHOUSE MACHINE COMPANY, A CORPORATION OF PENNSYLVANIA.

RAIL-TRAVERSING TRUCK.

No. 870,213.

Specification of Letters Patent.

Patented Nov. 5, 1907.

Application filed April 13, 1905. Serial No. 255,342.

*To all whom it may concern:*

Be it known that I, EDWIN E. ARNOLD, a citizen of the United States, and a resident of Wilkinsburg, in the county of Allegheny and State of Pennsylvania, have invented a new and useful Improvement in Rail-Traversing Trucks, of which the following is a specification.

This invention relates to rail-traversing vehicles, and more particularly to the trucks of such vehicles.

In motor vehicles, used for freight carriers between the different shops of a manufacturing establishment, and in all trucks designed to be operated on rails, the increase of rolling friction on account of the curvature in the tracks, has been the source of considerable difficulty. Double trucks, in their efforts to turn about their mounting spindle, in rounding a curve, jam the flange of the outside front wheel and the flange of the inside back wheel against the rail and thus increase the wear on the rails, the wear on the wheel-tires, and the rolling friction.

For certain lengths of wheel-base there is a limit to the degree of curvature for curves on which the truck can be successfully operated, but even before this limiting curve is reached, the power necessary to operate the truck on a curve is excessive.

The object of this invention is the production of a truck of simple construction, adapted to be used as a motor truck and capable of being operated on curves without materially increasing the rolling friction, and one in which the tendency to derail on curves is substantially overcome. This and other objects I attain in a truck embodying the features herein described, illustrated and set forth.

Figure 1:
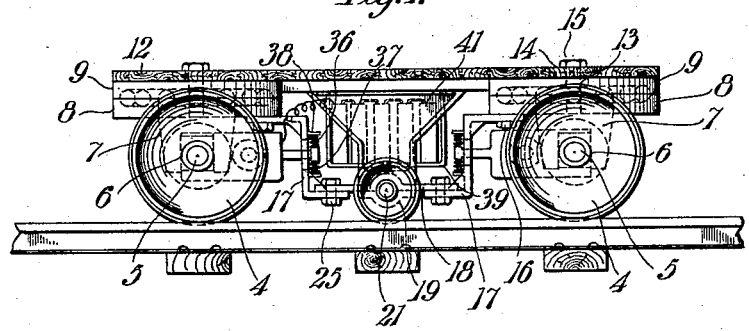
Figure 2:
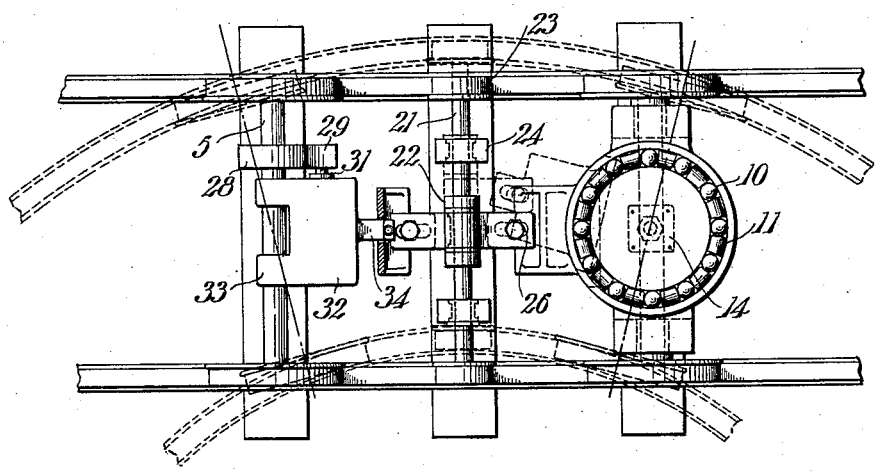

In the single sheet of drawing accompanying this application and forming a part thereof, Figure 1 is a side elevation of a motor truck embodying this invention, shown in connection with a portion of the track on which it operates. Fig. 2 is a diagrammatic plan view of the motor truck, showing the relative position of its elements when operating on a tangent and when on a curve.

Flange wheels 4 are mounted on axles 5, which are provided with suitable bearings 6 mounted on a portion 7 which is connected to a disk-portion 8 forming a part of a ball-bearing thrust-joint or fifth-wheel 9, which is supplied with balls 10 between which are arranged separating or spacing pieces 11. The disk 8 is connected to the frame 12 of the truck by a pin 13, which is supplied with a suitable bearing-plate 14 and nut 15 for holding it in place.

Attached to the disk-portion 8 of the fifth-wheel 9, by bolts 16, is a portion 17, which is connected to a lug 18 of a rotatively mounted sleeve 19 surrounding an auxiliary axle 21. The axle 21 is provided with rigidly mounted collars 22 for holding the sleeve 19 in place and is also provided with the flanged wheels 23 and suitable bearings 24, rigidly mounted to the frame portion 12 of the truck.

A bolt 25, connected to the portion 17, operates in the slot 26 with which the lug 18 is provided. A gear-wheel 28, rigidly mounted to the axle 5 meshes with and is operated by a gear-wheel 29 which is mounted on the shaft 31 of the operating motor contained within the motor-box 32. The motor-box is provided with arms 33 which are journaled on the axle 5 and an arm 34 which, operating against the springs 36 and 37, attached to the lugs 38 with which the portion 17 is provided, hold it (the said motor-box) in an operating position as is usual with street-car motors and similar apparatus.

The frame 12 of the truck is provided with a shelf 39, adapted to carry storage batteries 41 for operating the motors contained within the motor box 32.

The auxiliary axle 21 is so arranged that while it rotates in its bearings, it is capable of longitudinal motion relative to the bearings, and, because of this longitudinal motion through its bearings, it will move laterally to different positions, dependent upon the curvature of the track, and the arrangement is such that the axles 5 will be turned on the fifth-wheel 9 about the pin 13 to different angles, dependent upon the position of the auxiliary axle 21. This is accomplished through the operation of the sleeve 19 against the bolts 25 connected to the portion 17, which is connected by the bolts 16 to the disk-portion 8 to which the bearing of the axle 5 is attached.

In Fig. 2, the position of the different parts of the truck in operating on a tangent or a straight piece of track is shown by the full lines, and the dotted lines show the relative positions of the different parts while operating on a curve.

It is apparent that the axles 5 will take positions substantially coincident with the radii of the curve on which they are operating, and, in so doing, permit the wheels 4 to roll around the curve with comparative ease; the friction encountered on the curve then being practically equal to the rolling friction encountered on a tangent.

The position of the wheels 23 and consequently of the auxiliary axle 21 is such, while the truck is operating on a tangent, that the axles 5 will be held in parallel positions and the wheels will then tend to roll in a straight line.

It is evident that the difficulty encountered by the flanges of the outer front wheel and the inner back wheel jamming against the rail is overcome, and as the position of the axles is such that the wheels would naturally follow the rails, even in rounding a curve, the tendency of their being derailed is practically overcome. With this construction, it is also apparent that the limits of curvature for a certain length of wheelbase may be considerably increased and that the car can readily roll around curves, without danger of derailment, that would be impractical for ordinary trucks.

The auxiliary axle and its bearings may or may not be so designed that a portion of the weight sustained by the truck is carried by them. A truck embodying these features may be constructed to take the place of the ordinary form of double trucks now common, and the frame portion 12 of the truck could then be mounted to the car frame by a spindle or swivel-pin.

Although I have described but one embodiment of my invention, it is apparent that many variations and changes in details of construction would readily suggest themselves to persons skilled in the art and still fall within the spirit and scope of this invention, and

What I claim and desire to secure by Letters Patent is:—

1. In a rail traversing truck, a frame portion, a main wheel-carrying axle pivotally mounted thereon, an auxiliary wheel-carrying axle, bearings therefor mounted on said frame portion through which said axle is longitudinally movable, a collar formed on said auxiliary axle, a sleeve rotatably mounted on said axle between said collars and an arm carried by said sleeve and operating through a slot connection to vary the position of said main axle relative to said frame portion.

2. In a rail traversing truck, a frame portion, main wheel-carrying axles pivotally mounted at each end of said portion, an auxiliary wheel-carrying axle, bearings therefor mounted on said portion and through which said axle is longitudinally movable, collars formed on said auxiliary axle, a sleeve rotatably mounted between said collars and an arm carried by said sleeve and operating through slot connections to vary the positions of said main axles relative to said frame portion.

In testimony whereof, I have hereunto subscribed my name this eleventh day of April, 1905.

EDWIN E. ARNOLD.

Witnesses:
　DAVID WILLIAMS,
　JNO. S. GREEN.